US008612187B2

(12) United States Patent
Amadu

(10) Patent No.: US 8,612,187 B2
(45) Date of Patent: Dec. 17, 2013

(54) TEST PLATFORM IMPLEMENTED BY A METHOD FOR POSITIONING A SOUND OBJECT IN A 3D SOUND ENVIRONMENT

(75) Inventor: Frederic Amadu, Chelles (FR)

(73) Assignee: Arkamys, Paris (FR)

( * ) Notice: Subject to any disclaimer, the term of this patent is extended or adjusted under 35 U.S.C. 154(b) by 192 days.

(21) Appl. No.: 13/148,375

(22) PCT Filed: Feb. 11, 2010

(86) PCT No.: PCT/FR2010/050239
§ 371 (c)(1),
(2), (4) Date: Oct. 14, 2011

(87) PCT Pub. No.: WO2010/092307
PCT Pub. Date: Aug. 19, 2010

(65) Prior Publication Data

US 2012/0022842 A1 Jan. 26, 2012

(30) Foreign Application Priority Data

Feb. 11, 2009 (FR) .................................... 09 50861

(51) Int. Cl.
*G06F 17/50* (2006.01)
*G06F 3/00* (2006.01)

(52) U.S. Cl.
USPC ........ 703/2; 703/6; 345/156; 381/61; 381/77; 359/13

(58) Field of Classification Search
USPC .......... 703/6, 2; 345/156; 381/61, 77; 359/13
See application file for complete search history.

(56) References Cited

U.S. PATENT DOCUMENTS

| | | | | |
|---|---|---|---|---|
| 5,977,471 | A * | 11/1999 | Rosenzweig | 84/633 |
| 6,229,899 | B1 * | 5/2001 | Norris et al. | 381/77 |
| 6,577,738 | B2 * | 6/2003 | Norris et al. | 381/77 |
| 7,626,569 | B2 * | 12/2009 | Lanier | 345/156 |
| 2001/0055397 | A1 * | 12/2001 | Norris et al. | 381/79 |
| 2003/0007648 | A1 * | 1/2003 | Currell | 381/61 |
| 2004/0247140 | A1 * | 12/2004 | Norris et al. | 381/77 |
| 2004/0264704 | A1 | 12/2004 | Huin et al. | |
| 2005/0264857 | A1 * | 12/2005 | Vesely et al. | 359/13 |
| 2005/0275914 | A1 * | 12/2005 | Vesely et al. | 359/13 |
| 2005/0281411 | A1 * | 12/2005 | Vesely et al. | 381/61 |

OTHER PUBLICATIONS

Jot et al.: "Binaural Simulation of Complex Acoustic Scenes for Interactive Audio", Proceedings of the International AES Conference, vol. 121, Jan. 1, 2006, pp. 1-20, XP007905995.

(Continued)

*Primary Examiner* — Thai Phan
(74) *Attorney, Agent, or Firm* — Young & Thompson

(57) ABSTRACT

A test platform (11) for facilitating the selection of a sound configuration that is suitable for a target audio system that has a limited processing power (Pmax). During an objective selection of the configurations, the platform (11) adopts—from among a set of possible configurations—the sound configurations that are compatible with the available power (Pmax) of the audio system. Next, the platform (11) makes it possible for an integrator to test the sound rendering of each configuration adopted by enabling the selection of the number of virtual loudspeakers and the order (14.2) of the HRTF filters. For this purpose, the integrator can select different types of sound sources to which to listen. After listening to the sound rendering of different sound configurations, the integrator can select the configuration that is most suitable to the target audio system.

11 Claims, 4 Drawing Sheets

(56) References Cited

OTHER PUBLICATIONS

Huopaniemi et al.:"Spectral and Time-Domain Preprocessing and the Choice of Modeling Error Criteria for Binaural Digital Filters", Proceedings of the AES 16th International Conference: Spatial Sound Reproduction, Apr. 9, 1999-Apr. 12, 1999, pp. 301-311, XP002534941.

Amadu et al.: "An efficient implementation of 3D audio engine for mobile devices", AES 35th International Conference, Feb. 11, 2009-Feb. 13, 2009, pp. 1-6, XP00258192.

International Search Report, dated Jun. 8, 2010, in PCT/FR2010/050239.

* cited by examiner

T1

| speaker | azimuth | elevation |
|---|---|---|
| S1 | 55° | 0° |
| S2 | 125° | 0° |
| S3 | -125° | 0° |
| S4 | -55° | 0° |
| S5 | 180° | -55° |
| S6 | 0° | -55° |
| S7 | 180° | 55° |
| S8 | 0° | 55° |

T2

| | C2 | | C2' | |
|---|---|---|---|---|
| speaker | az | el | az | el |
| S1 | 0° | -19° | -60° | -19° |
| S2 | 120° | -19° | 60° | -19° |
| S3 | -120° | -19° | 180° | -19° |
| S4 | 0° | 90° | 0° | 90° |

T3

| | C3 | | C3' | |
|---|---|---|---|---|
| speaker | az | el | az | el |
| S1 | 0° | 0° | -60° | 0° |
| S2 | 120° | 0° | 60° | 0° |
| S3 | -120° | 0° | 180° | 0° |
| S4 | 0° | -90° | 0° | -90° |
| S5 | 0° | 90° | 0° | 90° |

T4

| | C4 | | C4' | |
|---|---|---|---|---|
| speaker | az | el | az | el |
| S1 | 0° | 0° | -45° | 0° |
| S2 | 90° | 0° | 45° | 0° |
| S3 | 180° | 0° | 135° | 0° |
| S4 | -90° | 0° | -135° | 0° |
| S5 | 0° | -90° | 0° | -90° |
| S6 | 0° | 90° | 0° | 90° |

T5

| | C5 | | C5' | |
|---|---|---|---|---|
| speaker | az | el | az | el |
| S1 | 0° | 0° | 30° | 0° |
| S2 | 60° | 0° | 90° | 0° |
| S3 | 120° | 0° | 150° | 0° |
| S4 | 180° | 0° | -150° | 0° |
| S5 | -120° | 0° | -90° | 0° |
| S6 | -60° | 0° | -30° | 0° |
| S7 | 0° | -90° | 0° | -90° |
| S8 | 0° | 90° | 0° | 90° |

TEST PLATFORM IMPLEMENTED BY A METHOD FOR POSITIONING A SOUND OBJECT IN A 3D SOUND ENVIRONMENT

This invention relates to a test platform used with a process for positioning a sound object in a 3D sound environment. The object of the invention is in particular to allow the implementation of a 3D sound generation process that is optimally adapted to the capabilities of the target audio medium onto which it is to be integrated.

The invention finds particularly advantageous, but not exclusive, application for portable telephone-type audio media. However, the invention can also be implemented with PDAs, portable computers, MP3-type music players, or any other audio medium that can disseminate a 3D sound.

To produce 3D sound effects, it is known to position a sound source at each point of the space around an artificial human head ("dummy head") that comprises microphones at the location of the ears so as to extract for each point of the space

- A first HRTF (Head Related Transfer Function) filter, HRTF Right (HRTF R), corresponding to the path of the sound from the sound source to the user's right ear, and
- A second HRTF Left filter, HRTF L, corresponding to the path of the sound of the sound source to the user's left ear, in such a way as to obtain a pair of filters (HRTF R, HRTF L) for each point where the sound source has been positioned.

Next, by applying the calculated HRTF filter pairs to a given sound source, there is the impression that said sound source is located at the point where the filters had been calculated in advance.

Thus, FIG. 1 shows an artificial head 1 that comprises two microphones 3 and 4. By applying the pair of HRTF L and HRTF R filters to a sound source, there is the impression that said sound source emits from a point S that is positioned at the location where the pair of filters (HRTF L, HRTF R) had been calculated, while if the pair of filters HRTF' L and HRTF' R is applied, there is the impression that the sound source emits from a point S' that is positioned at the location where the pair of filters (HRTF L', HRTF G') had been calculated.

To obtain an optimal 3D sound effect, it is necessary to calculate the pairs of HRTF filters for a multitude of positions of the source around the artificial head every 5 or 10 degrees. Thus, for showing a maximum number of positions around the user's head, it is necessary to store more than 2,000 pairs of HRTF filters. This is not possible, however, taking into account the limited storage capabilities of portable telephones.

In addition, the conventionally used HRTF filters are of the FIR (finished impulse response filter) type that are resource-intensive and are not adapted to the memory capacities and processing speed of portable telephones.

The invention proposes resolving these problems by proposing a control process for 3D sound that can be adapted to any type of audio medium.

For this purpose, in the invention, only a limited number of HRTF filter pairs is preserved so as to create an environment that comprises a limited number of points that are seen, such as virtual loudspeakers, with the positioning of a 3D object around the head being achieved by adapting the broadcasting characteristics of different loudspeakers. Thus, by limiting the number of HRTF filters used, the consumption of the processor is limited during the implementation of the process according to the invention. The loudspeakers can be arranged according to several distinct configurations.

In addition, FIR-type HRTF filters are transformed into finished impulse response-type filters (IIR filters) that are less resource-intensive than FIR filters. Different methods have been considered so as to take advantage of the processing and memory occupancy performance of an IIR filter structure. Thus, the coefficients of FIR filters can be obtained from a known Prony-type time method or a known Yule Walker-type frequency method.

Furthermore, a test platform makes it possible to adapt the spatial configuration of virtual loudspeakers and/or the type of transformation of HRTF filters and/or the order of IIR filters to the available resources of the audio device.

The invention therefore relates to a test platform for facilitating the selection of a sound configuration that is suitable for an audio system that has a limited processing power for the implementation of the process according to the invention, characterized in that it comprises:

- Means for entering the available processing power for the audio system on which the process is to be implemented,
- Means for adopting—from among a set of possible sound configurations—the sound configurations that are compatible with the available power from the audio system,
- Means for testing the sound rendering of a configuration that is selected from among the configurations adopted, these means comprising
- An interface for selecting the number of virtual loudspeakers on the listening sphere and an interface for selecting the order of HRTF filters from among the configurations adopted, and
- Means for implementing the process according to the invention from at least one sound source, and
- Means for listening to the sound rendering of the selected sound configuration disseminating the sound source.

According to one embodiment, the means for testing the sound rendering also comprise an interface for selecting the method for transformation of FIR-type HRTF filters into IIR-type HRTF filters.

According to one embodiment, with a configuration being defined by a number of loudspeakers and the order of associated HRTF filters, the means for adopting the configurations that are compatible with the available power from the audio system comprise:

- Means for calculating the power of different possible configurations by multiplying the number of filters of the configuration by the consumption of a filter of given order, and
- Means for displacing the configurations that require a power that is greater than the available power of the audio system and adopting only the configurations that require power that is less than or equal to the available power of the audio system.

According to one embodiment, for each selected configuration, it comprises means for listening to the sound sources of different types from among in particular an intermittent white noise, a helicopter noise, an ambulance sound, or an insect sound.

According to one embodiment, it comprises means for modifying the azimuths and the elevations of the sound sources respectively so as to make the sound sources follow predetermined trajectories of different types, among them in particular circles, a left-right or right-left trajectory, or a front/rear or rear/front trajectory.

In addition, the invention relates to a process for positioning a sound object in a three-dimensional sound environment used in association with the test platform according to the invention, characterized in that it comprises the following stages:

Defining a sound space that comprises N distinct virtual loudspeakers positioned on a listening sphere in the center of which the listener is located, Positioning the sound object at a desired location of the listening sphere by adapting the characteristics of the input signals bound for each virtual loudspeaker, Applying to each of the N input signals a pair of HRTF filters corresponding to the positioning of the virtual loudspeaker for which the input signal is bound for obtaining a stereo sound signal by virtual loudspeaker, Adding up between them the sound signals from the left and the sound signals from the right between them to obtain a single broadcastable stereo sound signal that corresponds to the contribution of each of the virtual loudspeakers.

According to one implementation, for positioning a number M of sound objects in the three-dimensional sound environment, the following stages are implemented:

Independently positioning each of the M sound objects at a desired location of the listening sphere by adapting the characteristics of the input signals applied to each virtual loudspeaker so as to obtain, for each of the M sound objects, a set of input signals bound for the virtual loudspeakers, Adding up between them the input signals that correspond to each virtual loudspeaker input so as to obtain a single set of input signals to be applied to the virtual loudspeakers, and Applying—to each of the input signals of the set of input signals—a pair of HRTF filters corresponding to the positioning of the virtual loudspeaker to which is applied the processed input signal for obtaining a stereo sound signal by virtual loudspeaker, Adding up between them the sound signals from the left and the sound signals from the right between them for obtaining a single broadcastable stereo sound signal corresponding to the contribution of each of the virtual loudspeakers.

According to one implementation, for positioning the 3D object on the listening sphere, the input signals of the N virtual loudspeakers are weighted.

According to one implementation, it also comprises the stage of transforming FIR-type HRTF filters into IIR-type filters.

According to one implementation, it comprises the stage of applying attenuation modules to sound objects so as to simulate a distance between the listener and the sound object.

According to one implementation, it comprises the stage of applying a Prony-type algorithm to the impulse responses of FIR-type HRTF filters to obtain IIR-type HRTF filters of order N.

According to one implementation, it comprises the stage of extracting the interaural time differences of the impulse responses of the HRTF filters before applying the Prony-type algorithm.

According to one implementation, it comprises the following stages:

Extracting ITD time differences of the impulse response of the FIR-type HRTF filters, Extracting spectral magnitudes of impulse responses of the FIR-type HRTF filters, and Applying the Yule Walker method to extracted spectral magnitudes for obtaining IIR-type HRTF filters.

According to one implementation, it also comprises the stage of using a Bark-type bilinear transformation so as to modify the scale of the spectral magnitudes before and after the application of the Yule Walker method.

The invention will be better understood from reading the following description and from the examination of the accompanying figures. These figures are provided only by way of illustration but in no way limit the invention. They show:

FIG. 1 (already described): A view of an artificial head and positioning of virtual loudspeakers;

FIGS. 2-6: Representations of spatial configurations according to the invention of virtual loudspeakers on a listening sphere, and tables indicating the angular positions of these loudspeakers;

FIGS. 7-8: Diagrammatic representations of the stages of a "Prong"-type time method that makes it possible to transform the FIR-type HRTF filters into IIR-type filters;

FIGS. 9*a*-9*b*: A representation of the stages of a "Yule Walker"-type frequency method that makes it possible to transform the FIR-type HRTF filters into IIR-type filters;

FIG. 10: A representation of the graphic interface of the test platform according to the invention;

FIG. 11: A diagrammatic representation of a 3D sound generation motor according to the invention.

Identical elements keep the same reference from one figure to the next.

FIGS. 2 to 9 show spatial configurations of virtual loudspeakers Si located on a listening sphere A at the center of which a listener is located. Azimuth positions measured along the horizontal in clockwise direction and elevation positions measured along the vertical of the loudspeakers Si are indicated relative to a reference position R of azimuth 0 and elevation 0 corresponding to the point located facing the listener.

For positioning a sound object at a location of the listening sphere A, the broadcasting characteristics of the available loudspeakers are weighted. Such a process will, of course, make it possible to position sound objects at locations where virtual loudspeakers are found, but also at locations of the listening sphere A where virtual loudspeakers are not available. Thus, for example, if a first virtual loudspeaker, located facing the listener at point R (azimuth=0 and elevation=0), and a second virtual loudspeaker, located to the right of the listener (azimuth=90 and elevation=0), are used, a sound object is emitted at the same power by means of these two loudspeakers for positioning this sound object at an azimuth of 45 degrees to the right of the listener.

More specifically, FIG. 2 shows a configuration C1 according to which eight virtual loudspeakers S1-S8 are positioned at the location of the angles of a cube inscribed inside the listening sphere A. The azimuths and the elevations of loudspeakers S1-S8 are indicated in degrees in Table T1.

FIG. 3 shows two distinct tetrahedral configurations C2 and C2' according to which a virtual loudspeaker S4 is positioned above the listener's head (source S4 with a 0-degree azimuth and a 90-degree elevation) and three other loudspeakers S1-S3 are positioned under the horizontal listening plane of the listener. The azimuths (az) and the elevations (el) of the loudspeakers S1-S4 are indicated in degrees in Table T2 for each of the configurations C2 and C2'.

For the triphonic, quadraphonic, and hexaphonic configurations, the horizontal plane provides the reference of the system while the sound elevation effect relative to this reference plane is ensured by top and bottom loudspeakers. As a variant, it would be possible to consider any other configuration that comprises any number N of virtual loudspeakers located in the horizontal plane and two loudspeakers located respectively at the top and at the bottom of the listener's head.

Figure 7:
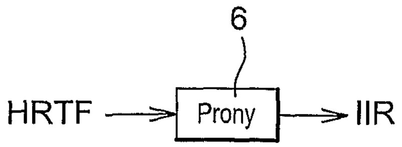
Figure 8:
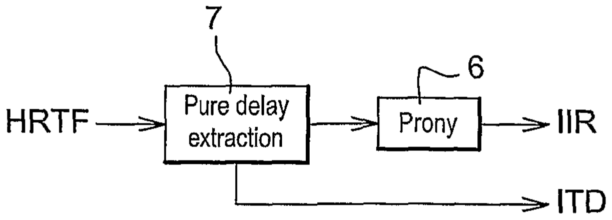

FIGS. 7 and 8 show methods for synthesizing HRTF filters from the temporal domain by using the known "Prony"-type method.

More specifically, FIG. 7 shows a process in which a Prony-type algorithm 6 is applied to the impulse responses of the FIR-type HRTF filters for obtaining several IIR-type filters of order N. In this implementation, the difference between the period of the path of sound to the right ear and the left ear (ITD for interaural time difference) is integrated completely in the IIR filter that is obtained.

FIG. 8 shows a variant embodiment in which the ITD time differences are extracted from the impulse response of the HRTF filters by means of a module 7 before using the Prony method.

Figure 9A:
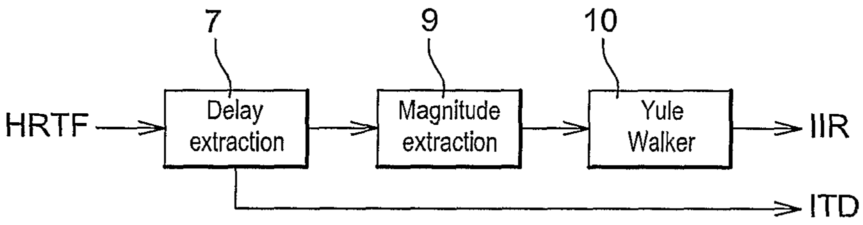

It is also possible to consider a method according to which the HRTF filters are approached by a pure ITD time difference and a minimum-phase IIR filter that is characterized by its spectral magnitude. Thus, FIG. 9*a* shows a process in which the ITD time differences are extracted as above by the module 7. The spectral magnitudes of the impulse responses of the HRTF filters are extracted by the module 9, and then the Yule Walker method is applied via the module 10 to the spectral magnitudes that are extracted for obtaining the IIR-type HRTF filters.

Figure 9B:
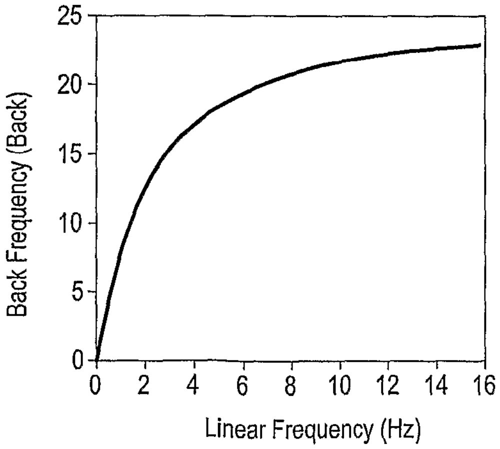

As a variant, a Bark-type bilinear transformation is used so as to modify the scale of spectral magnitudes before and after the application of the Yule Walker method. FIG. 9*b* shows the correspondence between the linear frequencies in Hertz and the Bark frequencies.

Figure 10:
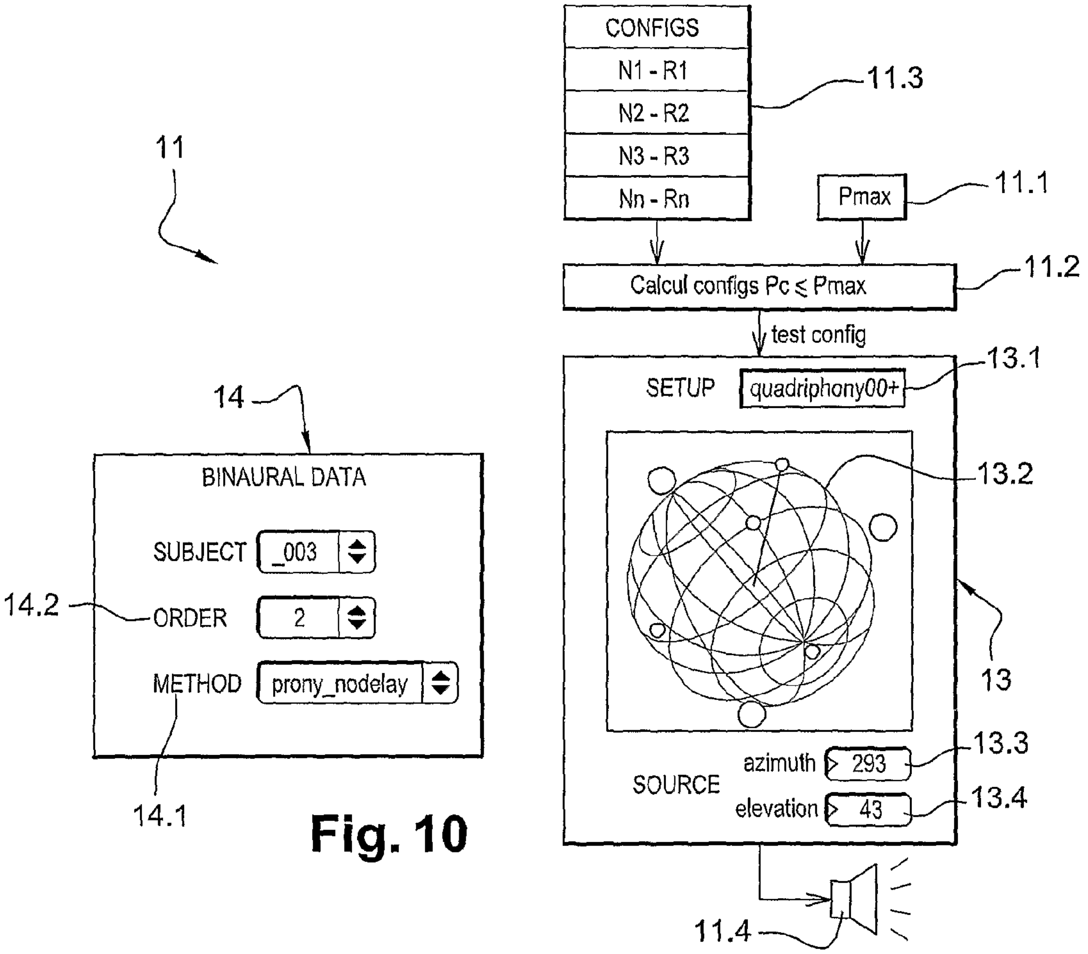

Given the number of variable parameters (spatial configurations of virtual loudspeakers, nature of the transformation of the FIR filter into an IIR filter, order of the filter), it is difficult to quickly identify the optimum configuration to implant on a given audio device. To facilitate this identification, a test platform 11 (see FIG. 10) that makes it possible with integrators to test different sound configurations has been developed.

For this purpose, during an objective selection stage, the platform 11 will displace the sound configurations, requiring an excessive calculating power Pc relative to the available calculating power Pmax for the target audio system on which the process according to the invention is designed to be implemented.

A sound configuration is defined by a number Ni of virtual loudspeakers (of points) and the order Ri of associated HRTF filters. If it is considered that the sound configurations 11.3 can comprise 3 to 10 points and that the order of filters is between 2 and 16, there are 8*15=120 possible sound configurations.

The power Pc that is necessary for a given sound configuration is essentially equal to the number of filters of the configuration multiplied by the consumption Q in Mhz of a filter of given order Ri. Since two filters are associated with each point (or virtual loudspeaker), the power consumed by a sound configuration with Ni points that uses a filter of order Ri amounts to: 2*Ni*Q Mhz.

Consequently, to displace unacceptable sound configurations 11.3, the user indicates the available power Pmax for the audio system to the platform 11 using the input interface 11.1. The calculating module 11.2 then compares the power Pc of the potential configurations 11.3 with the available power Pmax and will preserve only the configurations that require a calculating power that is less than or equal to the power Pmax.

Next, the platform 11 makes it possible to implement listening tests only on the configurations adopted (those that the target audio system can support, taking into account its memory resources and CPU).

Figure 1:
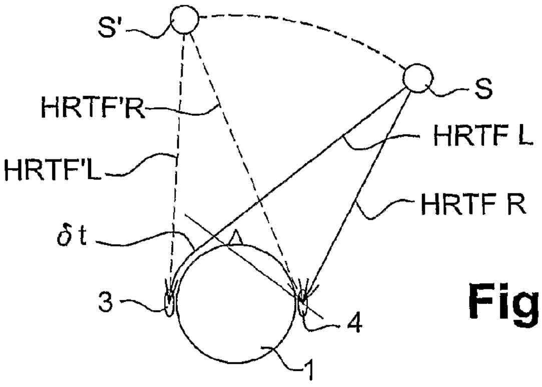
Figure 2:
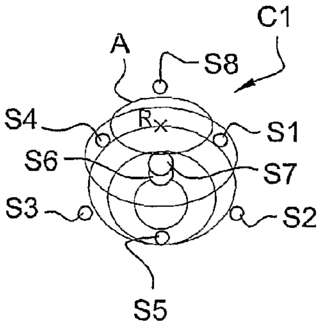
Figure 3:
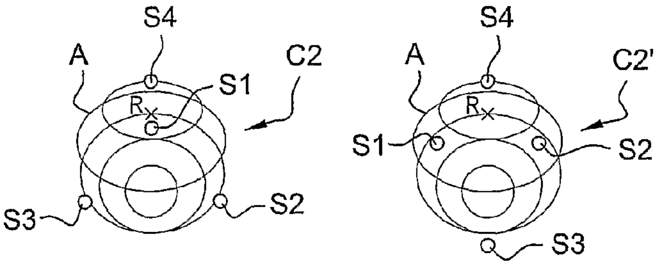
Figure 4:
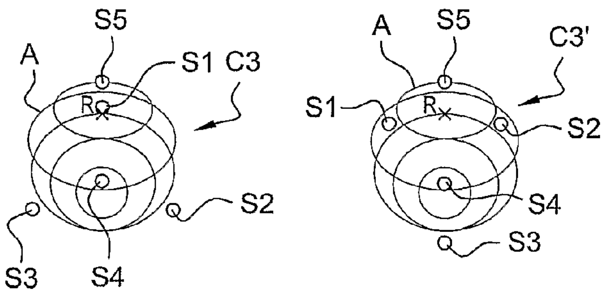
FIG. 4 shows two distinct triphonic configurations C3 and C3' according to which three loudspeakers S1-S3 are placed in the horizontal plane along an equilateral triangle, and two others S5 and S4 are positioned respectively above and below the listener's head. The azimuths (az) and the elevations (el) of the loudspeakers S1-S5 are indicated in Table T3 for each of the configurations C2 and C2'.
Figure 5:
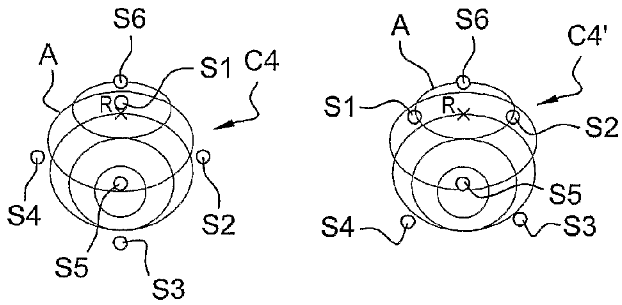
FIG. 5 shows two quadraphonic configurations C4 and C4' according to which four loudspeakers S1-S4 are positioned in the horizontal plane in a square, and two others S6 and S5 are respectively positioned above and below the listener's head. The azimuths (az) and the elevations (el) of the loudspeakers S1-S6 are indicated in Table T4 for each of the configurations C4 and C4'.
Figure 6:
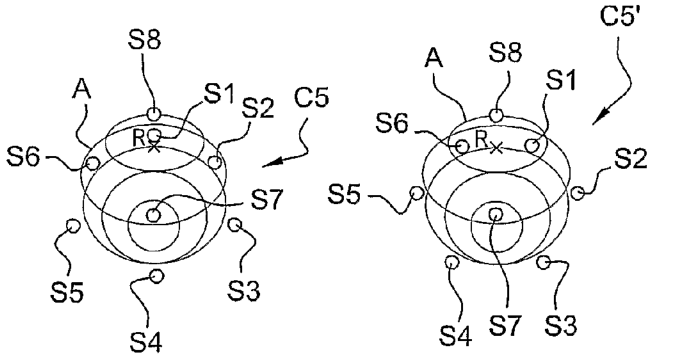
FIG. 6 shows two hexaphonic configurations C5 and C5' according to which six loudspeakers S1-S6 are positioned in a horizontal plane in a hexagon, and two others S8 and S7 are respectively positioned above and below the listener's head. The azimuths (az) and the elevations (el) of the loudspeakers S1-S8 are indicated in Table T5 for each of the configurations C5 and C5'.

For this purpose, the platform 11 comprises a graphic interface 13 that makes it possible to select—via the menu 13.1—the numbers of virtual loudspeakers and their spatial configurations, with the selected spatial configuration being displayed in the window 13.2. Here, it is the quadraphonic configuration of FIG. 5 that is selected.

The platform 11 also comprises a graphic interface 14 that makes it possible to select—via the menu 14.1—the method for transformation of the HRTF filters (Prony, Yule Walker . . . ) as well as the order 14.2 of the desired filter. Here, the Prony method without extraction of the ITD has been selected for obtaining IIR filters of order 2.

The pair {number of loudspeakers (points) and order of filters} of the selected sound configuration is part of, of course, the sound configurations adopted during the preceding stage of objective selection of the sound configurations.

For each pair {number of points, order of filters} of the sound configuration, the integrator can perform listening tests so as to determine the configuration that makes possible the best 3D sound rendering for the target audio medium.

For this purpose, for each configuration selected from among the configurations adopted, the sound rendering of different types of sound sources selected from among in particular an intermittent white noise, a helicopter noise, an ambulance sound, or an insect sound will be listened to via the means 11.4.

It is possible to modify the azimuths and the elevations of the sound sources respectively by means of windows 13.3 and 13.4. It is thus possible to make these sources follow predetermined trajectories of different types, among them in particular circles, a left/right or right/left trajectory, or a front/rear or rear/front trajectory.

After having listened—for each adopted configuration—to different sound sources by having made them follow, if necessary, a particular trajectory, the integrator will be able to select the sound configuration making it possible to obtain the best sound rendering for the target audio system. This stage is a so-called subjective stage for selection of the optimal sound configuration that is best suited to the target audio device.

Figure 11:
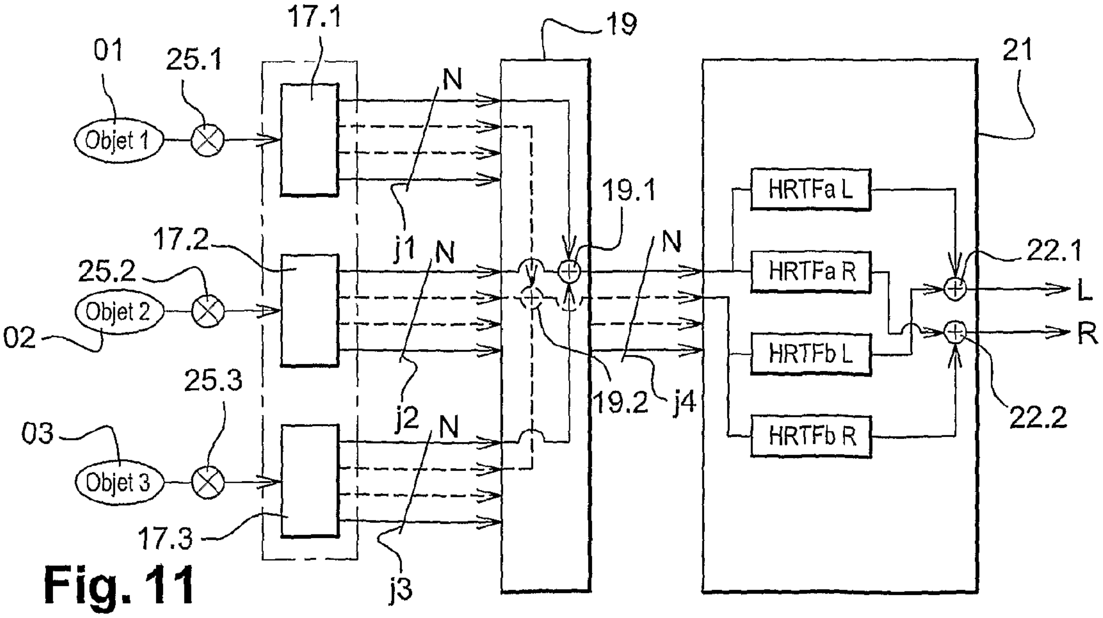

FIG. 11 shows a diagrammatic representation of a 3D audio motor according to the invention that makes it possible to position three sound objects O1-O3 in a 3-dimensional sound environment. Sound object is defined as a raw sound that does not have a 3D sound effect. In one example, these sound objects obtained from a video game could, for example, take on the form of bird song, a car noise, and a conversation.

These sound objects O1-O3 are first positioned independently of one another in a 3D environment that comprises a configuration with N virtual loudspeakers. For this purpose, a panoramic module 17.1-17.3 is applied to each sound object O1-O3 in such a way as to obtain—at the outputs of these modules 17.1-17.3—sets j1-j3 of N signals to be applied to the inputs of N virtual loudspeakers to obtain the desired positioning of each of the sound objects in its 3D environment. As a variant, orientation effects can also be applied by the modules 17.1-17.3, whereby these orientation effects consist in considering the listener's head as the reference point (x-axis facing him, y-axis on his right, and z-axis above his head). In this case, if the head moves, the sound objects O1-O3 move also.

Next, the three objects O1-O3 are positioned in the same 3D sound environment. For this purpose, the module 19 adds up between them the input signals of each virtual loudspeaker so as to obtain a single set j4 of N input signals to be applied to the inputs of N virtual loudspeakers. So as to facilitate the representation, only the summators 19.1, 19.2 making it possible to add up between them the first two input signals of the different loudspeakers have been shown. It should be noted that at this stage, if N virtual loudspeakers were actually available and if the N input signals of the set j4 were applied to the corresponding inputs of these N loudspeakers, the listener, positioned at the center of the configuration of the loudspeakers, perceives the sound objects O1-O3 at the desired location. The invention is used to obtain the same sound rendering as in this virtual space on a stereo headset by using HRTF filters to simulate these loudspeakers.

Next, using a virtual mixing module 21, the N signals of the loudspeakers are transformed into a stereo signal comprising a sound signal from the left L and a sound signal from the right R. For this purpose, a pair of HRTF filters corresponding to the positioning of the virtual loudspeaker for which the input signal is bound is applied to each of the input signals of the set j4 to obtain a stereo sound electrical signal by virtual loudspeaker.

Thus, the HRTFa L and HRTFb R filters corresponding to the position of the first virtual loudspeaker are applied to the input signal bound for this first loudspeaker. The HRTFb L and HRTFb R filters corresponding to the position of the second loudspeaker are applied to the input signal bound for this second loudspeaker. These HRTF filters are preferably IIR-type filters that are obtained according to the techniques disclosed above. For the sake of simplicity, the HRTF filters applied to the other input signals of the virtual loudspeakers have not been shown.

The sound signals from the left obtained at the output of these HRTF filters are added up between them by means of the summator 22.1, just like the sound signals from the right added up by means of the summator 22.2, so as to obtain respectively sound signals from the right R and sound signals from the left L of a stereo signal that can be applied at the input of a sound dissemination means.

As a variant, attenuation modules 25.1-25.3 are applied to the sound objects O1-O3 so as to simulate a distance between the listener and the sound object to be broadcast. The correspondence between the distance to be simulated and the coefficient to be applied to the sound objects is known a priori.

The principle of positioning sound objects according to the invention remains identical, of course, if 2 or more than 3 sound objects are to be positioned in the 3D sound environment. If there is only a single sound object to be positioned, the module 19 can be eliminated.

The invention claimed is:

1. Platform for testing different implementations of a process for positioning a sound object in a three-dimensional sound environment, characterized in that it comprises:

Means for selecting only the spatial configurations and the filter synthesis methods that the target audio device can support, taking into account its memory resources and CPU, An interface for selecting the spatial configuration of virtual loudspeakers on the listening sphere, An interface for selecting the method for transformation of FIR-type HRTF filters into IIR-type HRTF filters and the order of the IIR filters to be obtained, and Means for implementing —with different types of sound sources —the process that comprises the following stages:

Defining a sound space that comprises N distinct virtual loudspeakers positioned on a listening sphere in the center of which the listener is located, Positioning the sound object at a desired location of the listening sphere by adapting the characteristics of the input signals bound for each virtual loudspeaker, Applying to each of the N input signals a pair of HRTF filters corresponding to the positioning of the virtual loudspeaker for which the input signal is bound for obtaining a stereo sound signal by virtual loudspeaker, and Adding up between them the sound signals from the left and the sound signals from the right between them to obtain a single broadcastable stereo sound signal that corresponds to the contribution of each of the virtual loudspeakers so as to be able to select the configuration and the method for transformation of the HRTF filters that is the most suitable for an audio system with a limited calculation and memory capacity.

2. Platform according to claim 1, wherein it comprises:

Means for entering the processing power that is available for the audio system in which the process is to be implemented, Means for adopting —from among a set of possible sound configurations —the sound configurations that are compatible with the available power of the audio system, Means for testing the sound rendering of a configuration that is selected from among the adopted configurations, whereby these means comprise An interface for selecting the number of virtual loudspeakers on the listening sphere and an interface for selecting the order of HRTF filters from among the adopted configurations, and Means for listening to the sound rendering of the selected sound configuration broadcasting the sound source.

3. Platform according to claim 2, wherein the means for testing the sound rendering also comprise an interface for selecting the method for transformation of the FIR-type HRTF filters into IIR-type HRTF filters.

4. Platform according to claim 3, wherein with a configuration being defined by a number of loudspeakers and the order of associated HRTF filters, the means for adopting the configurations that are compatible with the available power by the audio system comprise:

Means for calculating the power of different possible configurations by multiplying the number of filters of the configuration by the consumption of a filter of given order, and Means for displacing the configurations that require a power that is greater than the available power of the audio system and adopting only the configurations that require power that is less than or equal to the available power of the audio system.

5. Platform according to claim 3, wherein for each selected configuration, it comprises means for listening to the sound sources of different types from among in particular an intermittent white noise, a helicopter noise, an ambulance sound, or an insect sound.

6. Platform according to claim 5, wherein it comprises means for modifying the azimuths and the elevations of the sound sources respectively so as to make the sound sources follow predetermined trajectories of different types, among them in particular circles, a left-right or right-left trajectory, or a front/rear or rear/front trajectory.

7. Platform according to claim 2, wherein with a configuration being defined by a number of loudspeakers and the order of associated HRTF filters, the means for adopting the configurations that are compatible with the available power by the audio system comprise:

Means for calculating the power of different possible configurations by multiplying the number of filters of the configuration by the consumption of a filter of given order, and Means for displacing the configurations that require a power that is greater than the available power of the audio system and adopting only the configurations that require power that is less than or equal to the available power of the audio system.

8. Platform according to claim 7, wherein for each selected configuration, it comprises means for listening to the sound sources of different types from among in particular an intermittent white noise, a helicopter noise, an ambulance sound, or an insect sound.

9. Platform according to claim 2, wherein for each selected configuration, it comprises means for listening to the sound sources of different types from among in particular an intermittent white noise, a helicopter noise, an ambulance sound, or an insect sound.

10. Platform according to claim 9, wherein it comprises means for modifying the azimuths and the elevations of the sound sources respectively so as to make the sound sources follow predetermined trajectories of different types, among them in particular circles, a left-right or right-left trajectory, or a front/rear or rear/front trajectory.

11. Platform according to claim 8, wherein it comprises means for modifying the azimuths and the elevations of the sound sources respectively so as to make the sound sources follow predetermined trajectories of different types, among them in particular circles, a left-right or right-left trajectory, or a front/rear or rear/front trajectory.

* * * * *

UNITED STATES PATENT AND TRADEMARK OFFICE

CERTIFICATE OF CORRECTION

PATENT NO. : 8,612,187 B2
APPLICATION NO. : 13/148375
DATED : December 17, 2013
INVENTOR(S) : Frederic Amadu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 256 days.

Signed and Sealed this
Twenty-second Day of September, 2015

Michelle K. Lee

Michelle K. Lee
*Director of the United States Patent and Trademark Office*